UNITED STATES PATENT OFFICE.

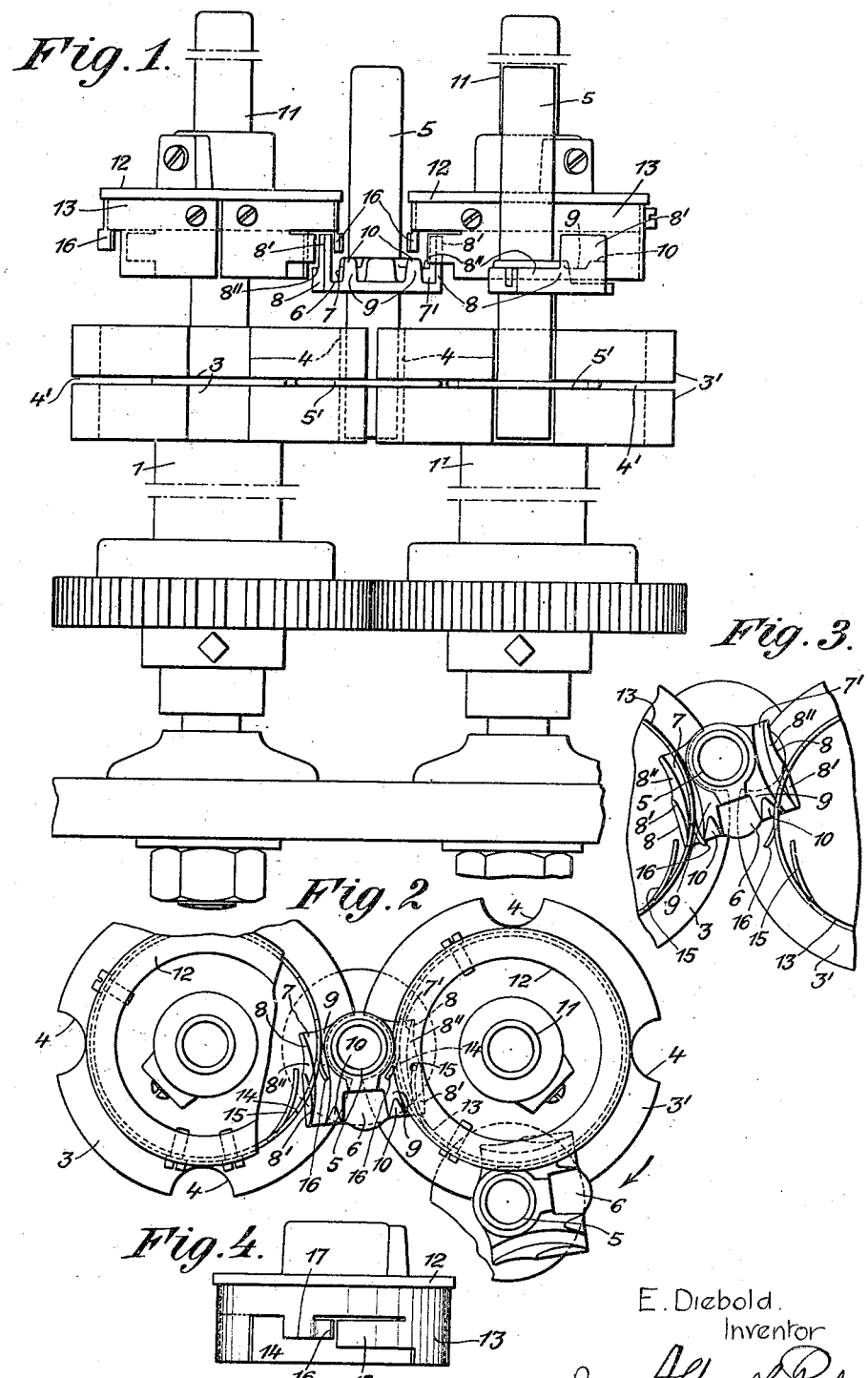

EMIL DIEBOLD, OF ENNETBADEN, SWITZERLAND.

BRAIDING-MACHINE.

1,296,271.	Specification of Letters Patent.	Patented Mar. 4, 1919.

Application filed May 18, 1917. Serial No. 169,480.

*To all whom it may concern:*

Be it known that I, EMIL DIEBOLD, a citizen of the Republic of Switzerland, residing at Ennetbaden, in the Canton of Aargau, Republic of Switzerland, (whose postoffice address is Ennetbaden,) have invented certain new and useful Improvements in Braiding-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to plaiting machines and more particularly to the mechanism for guiding and transferring the bobbin spindles from one driver to another in such machines operating without a track plate.

The object of the invention is to provide improvements in such spindle mechanisms whereby the bobbin spindles will be transferred from one driver to another and simultaneously hold against flinging away. The structure of this machine is very simple and it works with great ease and surety. For this purpose each spindle is provided with two segmental guide grooves concentric to two adjacent drivers, the outer wall of the said grooves being formed into steps. The stationary tube of each driver carries a guide and holding-rim which guides at times one of the said grooves and prevents the spindle from flinging away. The said rim is cut out at the points where the spindles are transferred from one driver to another and it is also provided at the said points with two turning off cams of which one is directed inwardly and the other outwardly, which cams produce a slight turning of the spindle at the point of transfer in order to effect the entering of the higher portion of the respective outer wall of the groove of the transferring spindle into the next guide-rim and turn off the spindle.

In the accompanying drawing, Figure 1 is a side elevation and Fig. 2 is a plan view of a braiding machine equipped with my improvement. Fig. 3 is a plan view of a spindle and Fig. 4 is a side elevation of a guide-rim.

In the drawing, 1 and 1' indicate two drivers, 3 and 3' the wheels of the drivers having the recesses 4 for the spindles 5 and a peripheral groove 4' adapted to hold and to guide the disks 5' of the spindles. Each spindle carries a plate 6 with two segmental grooves 7, 7' concentric to two adjacent drivers. The outer walls 8 of these grooves are formed into steps and the higher portion 8' is sharpened toward the lower part 8". The inner wall of each groove 7 respectively 7' is provided with a small projection 10 at the back end.

The stationary tube 11 of each driver carries a disk 12 having a hanging guide-rim 13. The left of the two guide-rims 13 has two recesses 14 diametrically opposed one to the other, while the right or end-guide-rim 13 has only one recess 14 next to the adjacent rim. The left guide-rim 13 has also two cams 15 and 16 diametrically opposed one to the other, the cam 15 being curved inward and the cam 16 outward. The portion 17 of the rim 13 carrying the cam 16 is somewhat higher than the cam 15 and both the cams 15 and 16 form a passage for the higher portion 8' of the facing groove of the entering spindle 5. The end-guide-rim has only one cam 15 at the inner side and one cam 16. Always one of the guide-grooves 7, 7' seizes the lower portion of the guide-rim 13 in such a way, that the respective outer graduated wall 8 of the groove of the spindle applies with some freedom against the inner wall of the rim 13 and the respective inner wall 9 of the groove of the spindle applies with some freedom against the outer wall of the rim 13, so that the spindle is surely guided along the rim 13 and at the same time is ready for flinging away.

The transfer of a spindle 5 from one driver to another is shown in Fig. 2. Assuming the right or end-driver 1' turns in the direction of the indicated arrow, the higher portion 8' of the outer wall 8 of the groove 7' coöperating with the right or end-guide-rim 13 is slightly turned off toward the right by the cam 15 of the said rim and the spindle 5 is slightly turned to the right, so that the higher portion 8' of the outer wall of the groove 7 is moved into the correct position to enter between the cams 15 and 16 of the left guide-rim 13. In the further turning of the drivers the higher wall portion 8' of the groove 7 follows the portion 17 of the left rim 13 and the lower portion 8" of the groove 7 applies against the inner side of the left rim 13, whereby the spindle 5 is transferred from the right or end-driver 1' to the left driver 1 as shown in Fig. 3. The lower portion 8'' of the outer wall of the groove 7 passes beneath the cams 15 and 16 of the left guide-rim 13, while the higher portion 8' of the outer wall 8' of the groove 7' passes through the recess 14 of the end-guide-rim 13, when the spindle 5 transfers from the right driver to the left driver. In order to prevent loosening of the spindle at the point of transfer by turning in the direction of the hand of a watch, the projection 10 is provided, which abuts against the left guide-rim 13 and prevents the said loosening or releasing of the spindle.

The walls 8, 9 seize the lower part of the left rim 13, guide the spindle and prevent flinging away of the latter. The operations as described are the same in each transfer of a spindle. The number of the drivers may be increased of course. The guide-rims 13 as well as the plates with the guide-grooves may be applied in different heights, so that different paths of the spindles may be obtained.

What I claim is:—

1. In a braiding machine without a track plate the combination of bobbin spindles each carrying a plate having two segmental guide-grooves concentric to two adjacent drivers, the outer wall of each groove being formed into steps, a guide- and holding-rim on each stationary tube of a driver to guide the said grooves and to prevent flinging away of the spindles the said rim having a recess at the points where a spindle is transferred from one driver to another, the said rim also having two cams of which one is directed inward and the other outward, which cams are adapted to produce a slight turning of the spindles at the point of transfer in order to effect the entering of the higher portion of the respective outer wall of the groove of the transferring spindle into the next guide-rim and to turn off the spindle.

2. In a braiding machine without a track plate the combination of bobbin spindles each carrying a plate having two segmental guide-grooves concentric to two adjacent drivers, the inner wall of each groove having a small projection at the back end and the other wall of each groove being formed into steps, a guide- and holding-rim on each stationary tube of a driver to guide the said grooves and to prevent flinging away of the spindles, the said rim having a recess at the points where a spindle is transferred from one driver to another, the said rim also having two cams of which one is directed inward and the other outward, which cams are adapted to produce a slight turning of the spindles at the point of transfer in order to effect the entering of the higher portion of the respective outer wall of the groove of the transferring spindle into the next guide-rim and to turn off the spindle.

3. In a braiding machine, a plurality of driving wheels having recesses therein for the reception of the bobbin spindles, a plate carried by each bobbin spindle and having two segmental guide-grooves concentric to two adjacent driving wheels, the outer wall of each groove projecting above the plate, a stationary member arranged concentric to each driving wheel, a rim carried by each of said members, one of said rims being provided with an inwardly projecting cam designed to engage the extending wall of one of the guide grooves when a spindle is moved around the rim for swinging said spindle about its axis, said rim being also provided with a recess to permit said projecting wall to escape from the rim during transferring, and the other rim being provided with an inwardly extending cam and an outwardly extending cam, designed to engage the other extending wall of the other guide groove in transferring the spindle from one driving wheel to the other.

In testimony whereof, I have signed my name to this specification in the presence of two subscribing witnesses.

EMIL DIEBOLD.

Copies of this patent may be obtained for five cents each, by addressing the "Commissioner of Patents, Washington, D. C."